United States Patent [19]

Krupicka

[11] 4,077,793

[45] Mar. 7, 1978

[54] COMPOSITION FOR FAVORING GERMINATION AND GROWTH OF THE VEGETABLE SPECIES AND ITS APPLICATION

[76] Inventor: Rudolf Krupicka, Rodauner Str. 22, 1238 Vienna, Austria

[21] Appl. No.: 781,637

[22] Filed: Mar. 28, 1977

[51] Int. Cl.$^2$ .............................................. C05F 11/08
[52] U.S. Cl. ............................................. 71/7; 71/65; 195/50; 195/56; 195/114
[58] Field of Search ................. 195/50, 56, 114; 71/1, 71/7, 65

[56] References Cited

U.S. PATENT DOCUMENTS

| | | | |
|---|---|---|---|
| 3,115,404 | 12/1963 | Carney | 71/7 X |
| 3,344,130 | 9/1967 | Mortenson | 195/50 |

FOREIGN PATENT DOCUMENTS

| | | | |
|---|---|---|---|
| 490,789 | 5/1975 | U.S.S.R. | 71/7 |

OTHER PUBLICATIONS

Text of Microbiology, Saunders, N.Y., 1954, Wm. Burrows, pp. 105–106.

*Primary Examiner*—Charles N. Hart
*Assistant Examiner*—Ferris H. Lander
*Attorney, Agent, or Firm*—Williamson, Bains, Moore & Hansen

[57] ABSTRACT

An improved biological product which is effective in causing nitrogen enrichment soil is comprised of one of the following nitrogen fixing soil microorganism: azotobacter chroococum, actinomycetes thermophylus, a.o., mixobacter cytophagea, or myxobacter cellvibrio. The biological product also comprises a nutrient for the microorganism including a phytohormone such as B-indolylacetic acid, tryptophan, GA$_3$, and Skatol. The nutrient material often includes a high molecular carbohydrate such as lactose or glucose and a nitrogenous source material such as urea, casein, albumin, or soy protein. Finally, the biological product includes an enzyme catalyst comprising wolfram or titanium, or a combination thereof. The enzyme catalyst probably reacts with the enzyme system of the microorganism in the conversion of the nitrogenous source material into nitrogen compounds which may be utilized as nutrient by plants.

4 Claims, No Drawings

COMPOSITION FOR FAVORING GERMINATION AND GROWTH OF THE VEGETABLE SPECIES AND ITS APPLICATION

SUMMARY OF THE INVENTION

This invention relates to an improved soil enriching product and more specifically to a biological product, which is effective in causing nitrogen enrichment of the soil.

In French Pat. No. 6,907,862, of which I am co-inventor, a biological product is disclosed for use in producing nitrogen enrichment of the soil. In this patent, the composition contains nitrogen fixing microorganisms and nutrient material which includes molybdenum and phytohormones, a source of nitrogenous material, and carbohydrates.

It has been found that salts of titanium and wolfram are highly effective as enzyme catalyst in promoting nitrogen fixation by certain soil microorganisms. Thus, it has been found that a biological product containing salts of titanium and wolfram when combined with the soil microorganisms and other nutrient material produce unusually good results.

It is therefore an object of this invention to provide an improved biological product for actively causing nitrogen enrichment of soil and which includes nitrogen fixing soil organisms, nutrient materials, and titanium and/or wolfram as an enzyme catalyst. Although the particular reactions involving the salts of titanium and/or wolfram are not precisely known, it is believed that the enzyme systems of the microorganisms utilize these metal catalysts in the nitrogen fixing process.

DESCRIPTION OF THE PREFERRED EMBODIMENT OF THE INVENTION

Although it is generally known that certain soil microorganisms are capable of fixing nitrogen in the soil, it is essential that these microorganisms be provided with certain nutrient materials in order to produce a continuous and growing nitrogen fixing function. In the instant application, the nutrient material is thought to be an improvement over the nutrient material and disclosed in my earlier French patent, Registration No. 6,907,862. The improved biological product includes nitrogen fixing soil microorganisms which may be selected from the group including azotobacter chroococum, actinomycetes thermophylus a.o., mixobacter cytophagea, and myxobacter cellvibrio. Of this group of soil microorganisms, it has been found that azotobacter chroococum functions extremely well in fixing nitrogen when combined with the improved nutrients of the present invention. In this respect, the improved nutrient will include phytohormones selected from the group comprising B-indolylacetic acid, tryptophan, $GA_3$, and Skatol, all of which are commercially available or are produced by above bacteria or sea weeds. The nutrient also includes high molecular carbohydrates preferably lactose or glucose.

Although the microorganism mentioned hereinabove, including azotobacter chroococum, are capable of fixing gaseous nitrogen in the soil, it has been found that by providing a source of nitrogenous material in the nutrient composition, rapid, continuous and growing nitrogen fixation will occur. The nitrogenous source material is preferably casein or albumin. The nutrient composition also includes an enzyme catalyst which is involved with the enzyme system of the microorganisms in the conversion of the nitrogenous source material into nitrogen compounds which may be utilized as nutrient by plant. The salts of titanium and/or wolfram have been found to be extremely good enzyme catalysts although the precise manner in which these enzyme catalysts function is not yet known. However, it is thought that when either titanium salt or wolfram salt are used, they are probably involved in the nitrogenase system. Nitrogenase is the expression given to the enzymes system which catalizes the reduction of molecular nitrogen, possibly by electrons made available on the oxidation of reduced ferredoxin. In this respect, it is pointed out that the nutrient composition will also include iron since it is known that iron is esesntial for nitrogen fixation in symbiotic organisms and that one of its function is haemoglobin synthesis.

It is also pointed out that the hydrogen-ion concentration of the nutrient composition is preferably within the range of pH 6.0 to 6.8. In this respect, it is found that azotobacter chroococum cannot fix nitrogen below pH 6.0.

The nutrient material to be combined with the microorganisms as a powder and may be applied to seedlings in a dusting operation. The composition may also be applied directly to the soil as a water spray.

When the biochemical is applied to seeds as a powder or as a spray to shooted plants, it has been found that the growing process as well as the fruit maturing process is accelerated. It has also been found that unusually good yields result from crops treated with my new biochemical compound. Earlier germination also occurs when certain crops such as maize, corn, ptotatoes and tomatoes are treated with my new biochemical product. The nutrient material apparently stimulates the microorganisms including their nitrogen fixing function which results in the creation of colonies and action on their excretion of phytohormones and enzymes for soil minerals for plant assimilation. The soil is enriched by humus, is more air-worthy and retains moisture to a greater degree than commercial chemical fertilizers.

The following examples of the application of my novel biochemical product,

EXAMPLE 1

When titanium hydroxide salt was added in amounts of one micrograms per kilogram of medium, and the medium was then used to innoculate soil with nitrogen fixing bacteria such as azotobacter chroococum it was found to be superior in maintaining the viability of the organism. Maize was planted in an experimental plot and a control plot having the same area.

|  | Production in maize |
|---|---|
| Control (no titanium salt) | 63 bushels |
| Medium with titanium hydroxide: | 78 bushels |

EXAMPLE II

When wolfram salt was added to the medium in amounts of one microgram per kilogram of medium and the medium used was then used to innoculate bacteria such as azotobacter chroococum, the superiority of wolfram added medium was shown in increased production. Again, maize was planted in an experimental plot and a control plot having the same area.

|  | Production in maize |
|---|---|
| Control (no wolfram salt) | 63 bushels |
| Medium with wolfram salt: | 74 bushels |

What is claimed is:

1. An improved biological product for actively producing nitrogen enrichment of soil, comprising:

nitrogen fixing soil microorganisms selected from the group comprising azotobacter chroococum, actinomycetes thermophylus, a.o., mixobacter cytophagea, myxobacter cellvibrio.

pytohormones selected from the group comprising B-indolylacetic acid, tryptophan, $GA_3$, and Skatol, either chemically produced or biologically available in products such as sea weed extracts or microbial extracts, a high molecular carbohydrate selected from the group comprising lactose and glucose, a nitrogenous source material selected from the group comprising of urea, casein, albumin or soy proteinate, and an enzyme catalyst selected from the group comprising titanium and wolfram which are reactive with the enzyme system of the microorganisms in the conversion of the nitrogenous source material into nitrogen compounds which may be utilized nutrients by plants.

2. The product as defined in claim 1 wherein said enzyme catalyst comprises titanium.

3. The biological product as defined in claim 1 wherein said enzyme catalyst comprises wolfram.

4. The biological product as defined in claim 1 wherein said enzyme catalysts comprise titanium and wolfram.

* * * * *

UNITED STATES PATENT AND TRADEMARK OFFICE
CERTIFICATE OF CORRECTION

PATENT NO. : 4,077,793
DATED : March 7, 1978
INVENTOR(S) : Rudolf Krupicka

It is certified that error appears in the above—identified patent and that said Letters Patent are hereby corrected as shown below:

Column 3, line 15, change "pytohormones" to --phytohormones--.

Signed and Sealed this

Twenty-fourth Day of October 1978

[SEAL]

Attest:

RUTH C. MASON
Attesting Officer

DONALD W. BANNER
Commissioner of Patents and Trademarks